Figure 1:
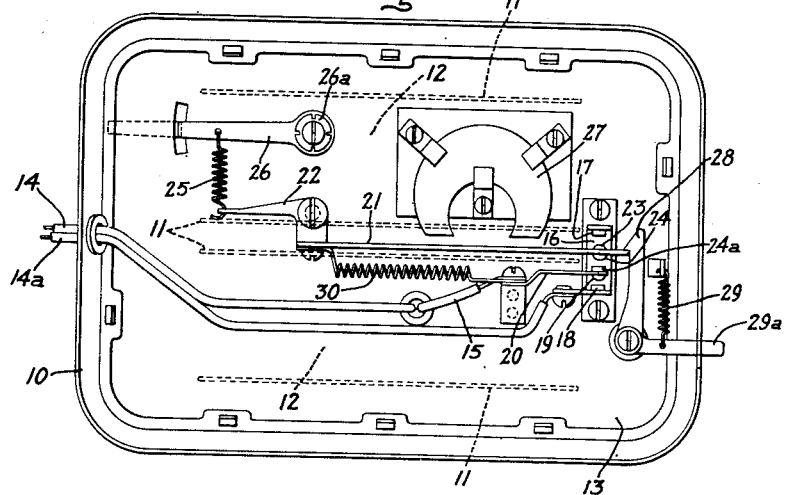

Jan. 6, 1942.  H. L. NEWELL  2,269,162

TIMING DEVICE

Filed Jan. 6, 1940

Inventor:
Heber L. Newell,
by Harry E. Dunham
His Attorney.

Patented Jan. 6, 1942

2,269,162

UNITED STATES PATENT OFFICE 2,269,162

TIMING DEVICE

Heber L. Newell, Stratford, Conn., assignor to General Electric Company, a corporation of New York Application January 6, 1940, Serial No. 312,706

8 Claims. (Cl. 161—16)

This invention relates to timing devices, more particularly to thermal timing devices, and it has for its object the provision of an improved device of this character.

While not limited thereto, this invention is particularly applicable to timing devices for measuring the cooking intervals of cooking apparatus; and it is especially useful in cooking apparatus in which the edible is cooked in a series of successive cooking operations, such as electric toasters, waffle irons, and the like.

In apparatus of this character if each of the successive cooking operations has the same time interval, it is not possible to obtain a uniformly cooked product during the period that the apparatus is heating up to a stable temperature, that is, during the heating up period, the edible of a succeeding cooking operation is not cooked to the same degree as that of the preceding cooking operation; if the edible cooked initially when the cooking apparatus is cold is treated to the proper degree during the cooking interval, then it is likely that the edibles of succeeding cooking operations will be over-cooked or burned; and if the final stable temperature is correct for the cooking operations, then the edibles cooked during the initial cooking intervals when the cooking apparatus is comparatively cool will be under-cooked.

This invention contemplates the provision of an improved thermally responsive timing means for measuring the successive cooking intervals, and also a timing means which will vary the duration of the cooking operation to compensate for variations in the temperature of the cooking apparatus, that is, for variations in the stored heat of the cooking apparatus.

In accordance with this invention, a suitable temperature responsive member is provided to measure a timing interval. This member is formed of thermo-magnetic material, the magnetization of which varies in accordance with temperature changes. The timing member is moved to a predetermined position by a suitable magnet to initiate the measurement of a time interval. Suitable means are provided to apply heat to the member at the same time that it is moved to this predetermined position. The member is heated to a predetermined temperature at which it loses its magnetism sufficiently to release itself from the attraction of the magnet, whereby it may move to another position to indicate or measure the termination of a time interval.

In one specific adaptation of this invention as applied to cooking apparatus, the thermo-magnetic member when attracted by the magnet initiates the cooking operation, and when it is released by the magnet to move to its other position, it shuts off the heat that has been applied to it while permitting the cooking operation to continue. When the member cools after the removal of heat from it, it is again attracted by the magnet and at this time it terminates the cooking operation.

If a second cooking operation be started after the termination of the first, the time required to heat the thermo-magnetic member to the temperature at which it will leave the magnet is some value less than that required for the first cooking operation, because at the start of the second cooking operation the thermo-magnetic member will have some stored heat in it. The thermal capacity of the thermo-magnetic member is proportioned to the thermal capacity of the cooking apparatus so that it will compensate for the residual heat of the cooking apparatus, that is, it will compensate for variations in the temperature of the cooking apparatus.

Figure 2:
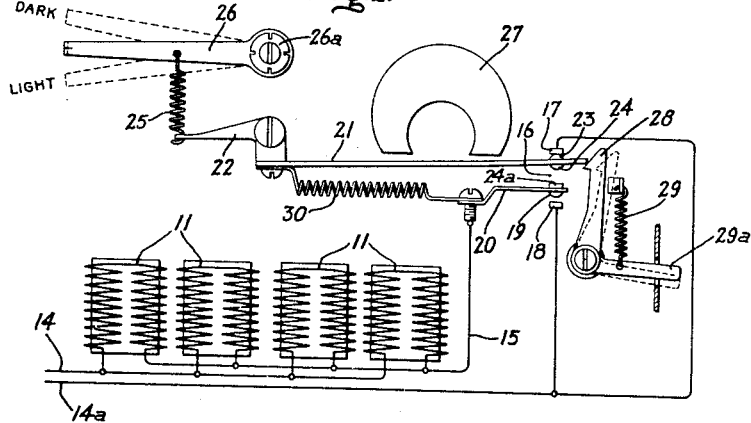
Figure 3:
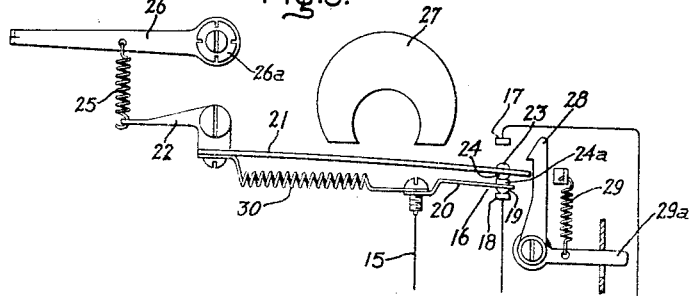

For a more complete understanding of this invention, reference should be had to the accompanying drawing in which Fig. 1 is a bottom plan view of an electric toaster provided with timing means arranged in accordance with this invention; Fig. 2 is a diagrammatic view showing this timing means, and heating elements for an electric toaster controlled by the timing means; and Fig. 3 is a fragmentary view similar to Fig. 2 but showing certain of the elements of the timing means in different operative positions.

Referring to the drawing, this invention has been shown in one form as applied to an electric toaster. As shown, this toaster comprises a base 10 upon which are mounted a plurality of heating elements 11 spaced apart to define two toasting chambers 12. It will be understood that a suitable casing (not shown) will be provided on the base 10 to house the heating elements 11. The base 10 is provided with a top wall 13 positioned under the heating chambers 12, as shown in Fig. 1. The toaster is provided with a pair of electrical supply leads 14 and 14a leading to a suitable source of electrical supply. As shown diagrammatically in Fig. 2, the conductor 14 is connected to one side of each of the heating elements 11, the other side of which is connected to a conductor 15. Connected in series with the conductor 15 and the other supply conductor 14a is a switch 16 mounted on the wall 13 of the base. The switch 16 has a pair of spaced contacts 17 and 18 each of which is connected to the conductor 14a. Cooperating with the contact 18 is a contact 19 mounted on a resilient switch arm 20 which biases the contact 19 away from the contact 18. The switch arm 20, as shown, is electrically connected with the conductor 15.

Mounted on the wall 13 is a control arm 21 arranged to move between the contacts 17 and 18. As shown, the control arm 21 has one end secured to a bell crank 22 pivotally mounted on the wall 13. The other end of the arm carries a contact 23 on one side arranged to engage the contact 17, and a button 24 on its opposite side arranged to operate the switch arm 20 to close the contacts 18 and 19. As shown, the switch arm 20 is provided with a button 24a which is engaged by the button 24.

The bell crank 22 is biased to move in a clockwise direction, as viewed in the drawing, by means of a tension spring 25 having one end anchored to an arm of the bell crank, as shown, and its other end secured to an adjustable lever 26. The spring therefore biases the control arm 21 to move downwardly, as viewed in the drawing, to cause the closure of the contacts 18 and 19. The lever 26 is frictionally held against the bottom wall 13 in any of its adjusted positions by means of a friction washer 26a, and preferably it will project out to the exterior of the toaster, as shown.

Movement of the control arm 21 downwardly to close the contacts 18 and 19 is opposed by a magnet 27 mounted on the wall 13. The magnet 27 is sufficiently strong to move the arm 21 upwardly against the force of the biasing spring 25 to cause the closure of the contacts 17 and 23. This movement upwardly, however, is opposed by a latch 28 mounted on the wall 13, and which is biased by a spring 29 in a counter-clockwise direction, as viewed in the drawing, into a latching position where it engages the free end of the control arm 21 to prevent its movement upwardly by the magnet 27. It will be observed that when the latch 28 is moved in the clockwise direction against the force of its biasing spring 29, it will free the control arm to move upwardly to close the contacts 17 and 23. Preferably, the latch will be provided with an operating arm 29a projecting out to the exterior of the toaster, as shown.

The control arm 21 is formed of a suitable thermomagnetic material which loses its magnetism when its temperature is elevated and which regains its magnetism when its temperature is reduced.

A suitable heating element 30 is provided positioned closely adjacent the control arm 21 to control its temperature. This heater has one end connected to the fixed end of the control arm 21 and its opposite end to the conductor 15 so that when the contacts 17 and 23 are closed the heater will be connected in series with the toaster heating elements 11 and with the supply conductors 14 and 14a. In other words, when the contacts 17 and 23 are closed, the toaster heating elements 11 will be energized and the heater 30 also will be energized; this circuit may be traced from the conductor 14, through the heating elements 11, the conductor 15, the heating element 30, the control arm 21, the contacts 23 and 17 and thence to the opposite supply conductor 14a.

When the heater 30 is energized it heats the control arm 21 and thereby reduces its magnetism, eventually to such a degree that it is released from the magnet 27; when this happens, the spring 25 will move the control arm 21 downwardly to shut the contacts 18 and 19. This operation short-circuits the heater 30, but maintains an energizing circuit for the toaster elements 11 which may be traced from the supply conductor 14, through the heating elements 11, the conductor 15, the switch arm 20, and the contacts 19 and 18 to the opposite supply conductor 14a. When the heating element 30 has been deenergized in this manner, the thermally responsive bar 21 is permitted to cool and as it cools it regains its magnetism. When its temperature has fallen to a predetermined low value it will have regained sufficient magnetism to cause the magnet 27 to attract it to move it toward its upper controlling position. The latch 28, however, intercepts the control arm 21 and prevents it from moving upwardly sufficiently far to reclose the contacts 17 and 23. When the control arm 21 moves away from its lower position it permits contacts 18 and 19 to open to deenergize the heating elements 11. Thus, the toasting interval is measured by the time required to heat the control arm 21 to cause it to move from its upper position to its lower position to close contacts 18 and 19, plus the time required for it to cool to its lower temperature at which the magnet 27 attracts it to move from its lower position to open the contacts 18 and 19.

To start another cooking operation the latch 28 is manually released which permits the control arm 21 to be moved upwardly by the magnet 27 to close the contacts 17 and 23. This energizes the toaster and the heater 30 and the above described cycle is repeated.

It is to be understood in the case of a toaster and like cooking apparatus wherein the edible is cooked in a series of successive steps that the control arm 21 will retain some stored heat at the end of a cooking operation, and therefore, if a new cooking operation be started fairly soon after an operation has been completed, less time will be required for the heating element 30 to heat the control arm to the high temperature at which it loses its magnetism and moves downwardly to its position where it shuts out the heater 30. Therefore, the time of the cooking interval will be shortened, the decrease in the time depending upon the amount of heat stored in the control arm. The thermal mass of the control arm 21 is proportioned to the thermal mass of the toaster so that it will compensate for all temperature variations in the toaster. As long as the toaster temperature is increasing, that of the control arm will be increasing and the successive toasting intervals will become shorter. When the toaster temperature is stabilized, that is, when the temperature of the metal parts of the toaster no longer increase, the temperature of the control arm 21 also will have become substantially stabilized so that thereafter it will not decrease the toasting interval. Should the toaster temperature fall, that of the control arm also will fall so as to increase the length of the toasting interval.

It is to be understood, therefore, that the control arm 21 will follow closely the temperature conditions of the toaster so that it will increase and decrease the toasting interval with decreases and increases in the toaster temperature, and that it will vary the toasting interval with all toaster temperature variations occurring during a toasting cycle.

The basic time setting for light and dark toast is set by adjusting the lever arm 26. If it be moved toward the position indicated "Dark" in Fig. 2, the toasting interval will be increased, and the slice will be toasted to a greater degree; conversely, if the lever be moved toward the position "Light" the toasting interval will be reduced and the slice will be toasted to a less degree.

While this invention has been shown as applied to a timing mechanism which utilizes both the heating and cooling of the control arm 21 to measure a time interval, it will be understood that if desired the heating period only may be used to time a cooking interval. In this case, the contacts 18 and 19 will be eliminated so that when the control arm moves away from the contact 17, it deenergizes both the toaster elements 11 and the heating element 30.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States, is:

1. A timing device for heating apparatus provided with a heater comprising a thermo-magnetic control element for said heater biased to a first position and the magnetization of which is reduced when said element is heated to a high temperature and is increased when it cools to a low temperature, heating means for heating said element, magnetic means for attracting said element to move from said first position to a second position, control means operated by said element when moved to said second position for controlling said heater and said heating means to apply heat to said apparatus and also for heating said element so as to cause it to lose its magnetism and move from said second position to said first position whereupon said control means controls said heating means to cease to heat said element and said heater is controlled to maintain the application of heat to said apparatus, said thermomagnetic member upon cooling being attracted away from said first position by said magnetic means so as to operate said control means to cause said heater to cease to apply heat to said apparatus, and releasable stop means preventing the return of said control element to said second position.

2. A timing device for controlling cooking apparatus comprising a control member for said apparatus movable to two spaced predetermined positions in each of which said cooking apparatus is heated, said member formed of a thermo-magnetic material which loses its magnetism as its temperature increases and regains it as its temperature decreases, a magnet attracting said member to the first of said positions to heat the cooking apparatus to start the cooking operation, means biasing said member to move to the second of said two positions, heating means operated by movement of said member to said first position to apply heat to the member to reduce its magnetism and thereby permit said biasing means to move said member to said second position, the heating means operated by the movement to the second position to shut off the heat from said member to thereby permit it to cool, the magnet attracting said member away from said second position when it cools to a predetermined low temperature, and means intercepting said member to prevent movement thereof to said first position.

3. A timing device for heating apparatus provided with a heater comprising a thermo-magnetic member whose magnetism decreases with increases in temperature and increases with decreases in temperature, means mounting said member for movement between two positions, a magnet for attracting it to the first of said positions, means biasing it to the second against the force of said magnet, heating means for applying heat to said member when the member is moved to said first position and for ceasing to apply heat when said member is moved to the second position to permit it to cool, means controlling said heater for said heating apparatus responsively to the movement of said thermo-magnetic member so that it applies heat to said apparatus when said member is in both of said positions and ceases to apply heat when said member moves from said second position to a third position intermediate said positions, and a stop at said third position for intercepting said member.

4. In cooking apparatus having a heating circuit, a control device comprising a control arm movable between two positions in each of which it energizes said circuit, said arm being formed of a thermo-magnetic material which loses its magnetism when heated and regains it when cooled, a magnet attracting said arm to move it to the first of said positions, means biasing said arm to move to the second of said positions, a heater controlled by said arm to apply heat to said arm when the arm moves to said first position so as to remove its magnetism and thereby permit said biasing means to move it to the second position and said heater being controlled by said arm to shut off the heat when the arm reaches said second position to permit the arm to cool and regain its magnetism, a latch constructed and arranged to engage said arm to prevent its movement to said first position when it regains its magnetism sufficiently to be attracted by said magnet, and means for releasing said latch to permit said arm to move to said first position.

5. An electric toaster comprising a heating chamber, heating means for said chamber, a thermo-magnetic control member whose magnetism varies inversely with temperature changes movable to a first controlling position to energize said heating means to start the toasting period, a magnet for moving said member to said position, a heater controlled by said member when moved to said first position to apply heat to said member to elevate its temperature sufficiently high to reduce its magnetism and thereby release it from said magnet, a spring biasing said member to move to a second controlling position when released by said magnet, the member when in said second position continuing the energization of said toaster heating means and shutting off said heater so that the member cools and regains its magnetism to a degree sufficiently great to cause the magnet to attract it from said second position to deenergize said toaster heating means to terminate the toasting period, and a manually releasable stop engaging said member to prevent its return to said first position by said magnet.

6. An electric toaster comprising a heating chamber, heating means for said chamber, a thermo-magnetic control member whose magnetism varies inversely with temperature changes movable to a first controlling position to energize said heating means to start the toasting period, a magnet for moving said member to said position, a heater controlled by said member when moved to said position to apply heat to said member to elevate its temperature sufficiently high to reduce its magnetism and thereby release it from said magnet, a spring biasing said member to move to a second controlling position when released by said magnet, the member when in said second position continuing the energization of said toaster heating means and shutting off said heater so that the member cools and regains its magnetism to a degree sufficiently great to cause the magnet to attract it from said second position to deenergize said toaster heating means to terminate the toasting period, a manually releasable stop engaging said member to prevent its return to said first position by said magnet, and manually operable means for adjusting the bias of said spring on said control member to vary the basic toasting interval.

7. A timing device for measuring the cooking interval of cooking apparatus provided with a heater comprising a thermo-magnetic member, the magnetism of which decreases with increases in temperature and is regained with decreases in temperature, a magnet attracting said member to a first predetermined controlling position, and said member biased to a second controlling position away from said magnet, means controlled by said thermomagnetic member controlling said heater to apply heat to said cooking apparatus and for heating said member when said member moves to said first predetermined position, the heat applied to said member causing it to lose its magnetism sufficiently to cause it to move to its second predetermined position wherein the means is controlled to reduce the heat applied to said thermo-magnetic member to permit said member to cool while said heater continues to apply heat to said cooking apparatus, the magnetism of said member increasing sufficiently as the member cools to cause the magnet to withdraw said member from said second position whereupon said means is controlled to shut off said heater to terminate the cooking operation, and releasable stop means for intercepting said member to prevent it from returning to said first position.

8. A cooking appliance comprising a heater, a magnetic control element for said heater, a magnet for attracting said element so as to effect relative movement between said members to one predetermined relative position to operate said heater to apply heat to said apparatus, a stop for preventing said movement to said one relative position releasable at will so as to permit said movement to start the heating of said appliance, said members being biased away from said one relative position to another relative position, and said magnetic element being formed of a magnetic material which loses its magnetism as it is heated and regains it as it is cooled, heating means for heating said element controlled by the movement of said members to said one relative position to apply heat to said element so that said element eventually attains such a high temperature that it loses its magnetism whereby said members are permitted to move to said other relative position, said heating means being operated thereby to cease to apply heat to said element to thereby permit it to cool for reattraction by said magnet to cause said members to move away from said other relative position toward said one relative position, said members when moved away from said other position and engaged by said stop operating to control the heater to reduce the heat applied to said appliance, and said element having a heat storage mass proportioned to the thermal capacity of said appliance to compensate for stored heat in said appliance so as to insure a uniformly cooked product.

HEBER L. NEWELL.